A. O. SVEDAHL.
TAIL LIGHT FOR AUTOMOBILES.
APPLICATION FILED JULY 12, 1920.
1,424,047.    Patented July 25, 1922.
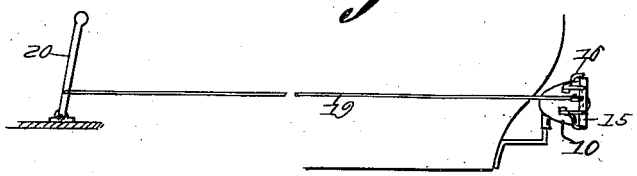
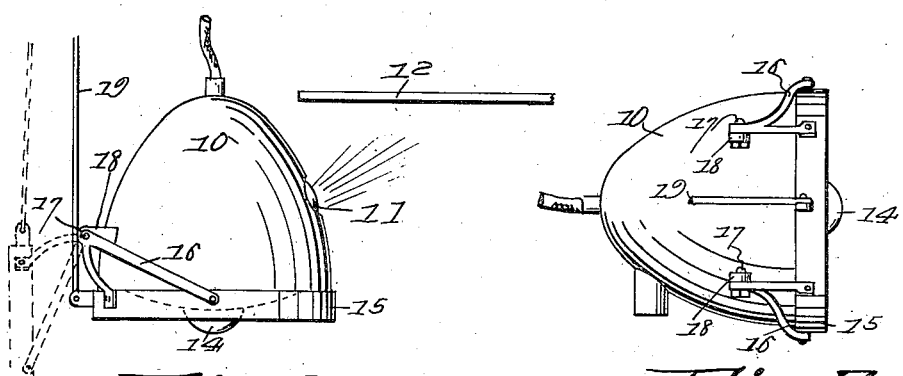
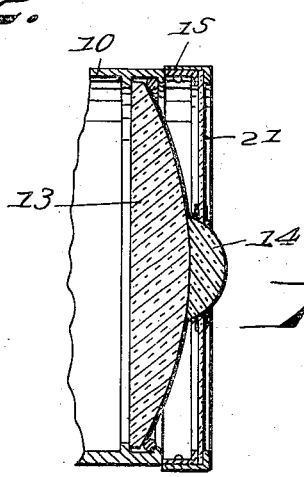
Inventor
August O. Svedahl,
By G. Hume Talbert
Attorney

UNITED STATES PATENT OFFICE.

AUGUST O. SVEDAHL, OF MARMARTH, NORTH DAKOTA.

TAIL LIGHT FOR AUTOMOBILES.

1,424,047. Specification of Letters Patent. Patented July 25, 1922.

Application filed July 12, 1920. Serial No. 395,586.

*To all whom it may concern:*

Be it known that I, AUGUST O. SVEDAHL, a citizen of the United States of America, residing at Marmarth, in the county of Slope and State of North Dakota, have invented new and useful Improvements in Tail Lights for Automobiles, of which the following is a specification.

The object of the invention is to provide a convertible tail light for automobiles and similar vehicles which, while adapted to perform the normal functions of a tail light in giving warning to the driver of following cars or vehicles of the presence and relative position and proximity of the car carrying the said light, is adapted to be converted into an illuminating unit to throw a white light to the rear of the car as a means of guiding the driver of the car in backing into a space for parking or for the purpose of obtaining turning room for the front wheels of the car in moving out of a parked position by causing a distinguishing light to be cast upon the vehicle or objects located in the rear of the vehicle which is being operated, and with these objects in view, the invention consists in a construction and combination of parts, of which a preferred embodiment is shown in the accompanying drawing, wherein:—

Figure 1, is a side view of a light embodying the invention applied in operative position to a car, the tail light of which is indicated diagrammatically.

Figure 2, is a plan view of the same showing in dotted lines the displaced position of the signal lens.

Figure 3 is a side view of the lamp.

Figure 4, is a sectional view of the lens portion of the lamp.

The apparatus consists essentially of a lamp casing or shell 10 which may be of any preferred form or construction, preferably having a side lens 11 for casting a light upon a license number or tag 12 and having a rearwardly directed illuminating lens 13 with relation to which is disposed a signal lens 14. In the construction illustrated, the signal lens is carried by a frame 15 having a supporting bracket 16 pivotally mounted as at 17 upon a lateral projection 18 of the lamp casing, said frame being connected as by a rod 19 or its equivalent with an operating device such as a hand lever 20 located within convenient reach of the driver of the car which is equipped with the tail light.

The signal lens as illustrated may consist of a convexed disk of red glass arranged in the center of a transparent light penetrable shield 21, co-extensive with the illuminating lens 13 which may be of white or plain glass, so that when the frame by which the signal lens is supported is in its normal position as indicated in full lines in the drawing, the lamp will perform the usual functions of a tail light and when the operator desires to have the benefit of a rearwardly projected light to discern with quickness and certainty objects in rear of his machine, as when backing to secure a parking position or to obtain starting space to leave a parked position, it is only necessary to manipulate the operating lever or handle 20 or its equivalent, to remove the shield as indicated by the dotted lines in Figure 2.

The invention having been described, what is claimed as new and useful is:—

A tail light for automobiles and similar vehicles having a lamp of which the casing is provided with a rearwardly directed illuminating lens and an annular frame adapted for arrangement in co-extensive relation with a rear end of the casing and having a pivoted carrying bracket, means for moving the said frame into and out of position in registration with the casing, and a signal lens carried by said frame for displacement in light intercepting relation with the illuminating lens, and disposed in a light penetrable medium co-extensive with said illuminating lens.

In testimony whereof I affix my signature.

AUGUST O. SVEDAHL.